(12) United States Patent
Bhalla (10) Patent No.: US 9,706,333 B2
(45) Date of Patent: Jul. 11, 2017

(54) METHOD AND APPARATUS FOR SUPPORTING MULTIPLE M2M SERVICE PROVIDERS ON AN M2M NODE

(71) Applicant: ZTE (USA) Inc., Morristown, NJ (US)

(72) Inventor: Rajesh Bhalla, Gahanna, OH (US)

(73) Assignee: ZTE (USA) Inc., Richardson, TX (US)

(*) Notice: Subject to any disclaimer, the term of this patent is extended or adjusted under 35 U.S.C. 154(b) by 0 days.

(21) Appl. No.: 14/392,353

(22) PCT Filed: Jun. 24, 2014

(86) PCT No.: PCT/US2014/043957
§ 371 (c)(1),
(2) Date: Dec. 23, 2015

(87) PCT Pub. No.: WO2014/210068
PCT Pub. Date: Dec. 31, 2014

(65) Prior Publication Data
US 2016/0198284 A1    Jul. 7, 2016

Related U.S. Application Data

(60) Provisional application No. 61/838,850, filed on Jun. 24, 2013.

(51) Int. Cl.
*H04W 72/04* (2009.01)
*H04W 4/00* (2009.01)
(Continued)

(52) U.S. Cl.
CPC ......... *H04W 4/005* (2013.01); *H04L 12/2814* (2013.01); *H04L 12/2834* (2013.01);
(Continued)

(58) Field of Classification Search
CPC ..... H04W 88/08; H04W 80/04; H04W 28/04; H04W 72/04
See application file for complete search history.

(56) References Cited

U.S. PATENT DOCUMENTS 8,184,596 B2 * 5/2012 Karlsson .............. H04W 16/14
370/335
8,925,017 B1 * 12/2014 Howard, Jr. ....... H04N 21/4622
725/48
(Continued)

FOREIGN PATENT DOCUMENTS

JP    2005-236340 A    9/2005
JP    2013-065189 A    4/2013
(Continued)

OTHER PUBLICATIONS

European Search Report mailed on Jan. 19, 2017 for European Application No. 14817075.6, filed on Jun. 24, 2014 (9 pages).
(Continued)

*Primary Examiner* — Andrew Lee
(74) *Attorney, Agent, or Firm* — Perkins Coie LLP (57) ABSTRACT

In a machine to machine (M2M) communication network comprising M2M application servers and M2M nodes such as M2M devices and gateways, applications that are specific to different M2M Service Providers (SPs) may be hosted. Different services are provided by different M2M Service Providers, while being hosted on a single Home Gateway, by the use of sensing and actuation equipment for different services. The home gateway may typically be owned by a home owner while some equipment may be services-specific and not owned by the home owner. Interfaces are provided enabling individual services providers to independently control resources allocated to their services hosted on the M2M node.

15 Claims, 7 Drawing Sheets

(51) Int. Cl.
*H04L 29/08* (2006.01)
*H04L 12/28* (2006.01)
*H04L 12/24* (2006.01)

(52) U.S. Cl.
CPC ............ *H04L 67/12* (2013.01); *H04L 69/321* (2013.01); *H04L 41/082* (2013.01)

(56) References Cited

U.S. PATENT DOCUMENTS

| | | | |
|---|---|---|---|
| 2003/0050100 A1* | 3/2003 | Dent | H04W 88/08 |
| | | | 455/562.1 |
| 2010/0115604 A1* | 5/2010 | Gerber | H04L 12/4641 |
| | | | 726/15 |
| 2011/0145413 A1* | 6/2011 | Dawson | G06Q 40/025 |
| | | | 709/226 |
| 2013/0003576 A1 | 1/2013 | Segura et al. | |
| 2013/0016657 A1 | 1/2013 | Muhanna et al. | |
| 2013/0094444 A1 | 4/2013 | Lai et al. | |
| 2013/0130644 A1 | 5/2013 | Busropan et al. | |
| 2014/0007076 A1 | 1/2014 | Kim et al. | |
| 2014/0122878 A1* | 5/2014 | Cho | H04L 67/02 |
| | | | 713/168 |
| 2014/0279992 A1* | 9/2014 | Morozov | G06F 17/30303 |
| | | | 707/706 |

FOREIGN PATENT DOCUMENTS

| | | |
|---|---|---|
| KR | 10-2012-0111852 A | 10/2012 |
| WO | 2012/109531 A2 | 8/2012 |
| WO | 2012/142618 A2 | 10/2012 |

OTHER PUBLICATIONS

Japanese Office Action mailed on Jan. 31, 2017 for Japanese Application No. 2016-523864, filed on Jun. 24, 2014 (9 pages).

* cited by examiner

METHOD AND APPARATUS FOR SUPPORTING MULTIPLE M2M SERVICE PROVIDERS ON AN M2M NODE

CROSS-REFERENCE TO RELATED APPLICATIONS

This patent document claims the benefit of priority of U.S. Provisional Application No. 61/838,850, filed on Jun. 24, 2013. The entire content of the before-mentioned patent application is incorporated by reference as part of the disclosure of this document.

BACKGROUND

This patent document relates to communications, including machine type communications (MTC) and machine to machine (M2M) communications.

In many applications, wireless devices operating in a wireless network communicate with other devices and servers that are not operating in the wireless network but can be communicatively reachable. Various standards are available to provide such connectivity to wireless devices. For example, the Internet Protocol (IP) is one such framework by which a wireless device can be communicatively coupled with other devices, based on an IP address assigned to the wireless devices.

Certain operational cases, such as in systems that include machine type communications (MTC) and machine to machine (M2M) communications wireless devices, may lack the framework for IP connectivity.

SUMMARY

Techniques, systems and apparatus are described for implementing Machine to machine (M2M) services in which multiple service providers can be concurrently operating on an M2M node, without having to necessarily depend on each other and without interfering with each other's resources, are supported.

In one example aspect, a disclosed apparatus for M2M service deployment includes a first application environment that is specific to a first service provider and includes a first sensing and actuation function specific to the first service provider, a second application environment that is specific to a second service provider and includes a second sensing and actuation function specific to the second service provider and an underlying network communication capabilities module that provides network communication to the first application environment and the second application environment. The first application environment and the second application environment use a common resource set for communicating with the underlying network communication capabilities. The first application environment and the second application environment comprises at least some mutually exclusive resources.

In another example aspect, a method of enabling use of a machine to machine (M2M) communication node by multiple service providers is disclosed. The method includes providing, on the M2M communication node, a first application environment that is specific to a first service provider and includes a first sensing and actuation function specific to the first service provider, providing, on the M2M communication node, a second application environment that is specific to a second service provider and includes a second sensing and actuation function specific to the second service provider, and providing an underlying network communication capabilities module that provides network communication to the first application environment and the second application environment. The first application environment and the second application environment use a common resource set for communicating with the underlying network communication capabilities. The first application environment and the second application environment comprises at least some mutually exclusive resources.

In yet another example aspect, a machine to machine (M2M) communication system is disclosed. The system includes a first M2M application server that hosts a first M2M application service, a second M2M application server that hosts a second M2M application service and an M2M node communicatively coupled to the first M2M application server and the second M2M application server via an access network. The M2M node includes a first application environment that is specific to the first M2M application service, a second application environment that is specific to the second application service, an underlying network communication capabilities module that provides network communication to the first application environment and the second application environment, and wherein the first application environment and the second application environment use a common resource set for communicating with the underlying network communication capabilities, and wherein the first application environment and the second application environment comprises at least some mutually exclusive resources.

DETAILED DESCRIPTION

Figure 1:
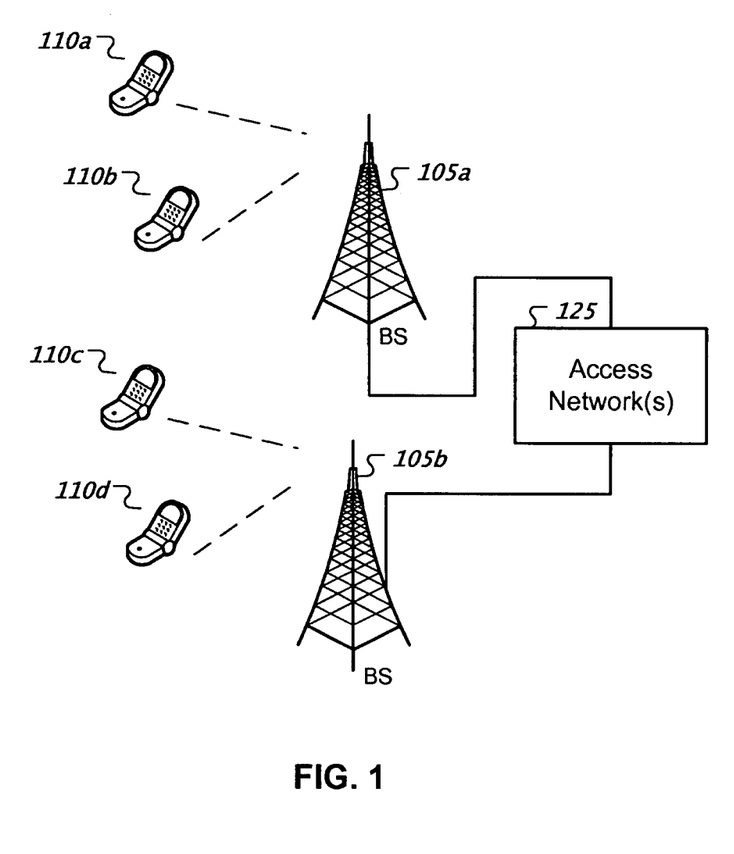
FIG. 1 is a block diagram representation of a wireless communications network.

FIG. 1 shows an example of a wireless communication system. A wireless communication system can include one or more base stations (BSs) 105a, 105b, one or more wireless devices 110 and an access network 125. Base station 105a, 105b can provide wireless service to wireless devices 110 in one or more wireless sectors. In some implementations, a base station (e.g., 105a or 105b) includes directional antennas to produce two or more directional beams to provide wireless coverage in different sectors.

The access network 125 can communicate with one or more base stations 105a, 105b. In some implementations, the access network 125 includes one or more base stations 105a, 105b. In some implementations, the access network 125 is in communication with a core network (not shown in FIG. 1) that provides connectivity with other wireless communication systems and wired communication systems. The core network may include one or more service subscription databases to store information related to the subscribed wireless devices 110. A first base station 105a can provide wireless service based on a first radio access technology, whereas a second base station 105a can provide wireless service based on a second radio access technology. The base stations 105a may be co-located or may be separately installed in the field according to the deployment scenario. The access network 125 can support multiple different radio access technologies.

Various examples of wireless communication systems and access networks that can implement the present techniques and systems include, among others, wireless communication systems based Code Division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO). For CDMA200 systems, the core network 125 can include, among others, mobile switching center (MSC), Packet Data Serving Node (PDSN) and others.

Figure 2:
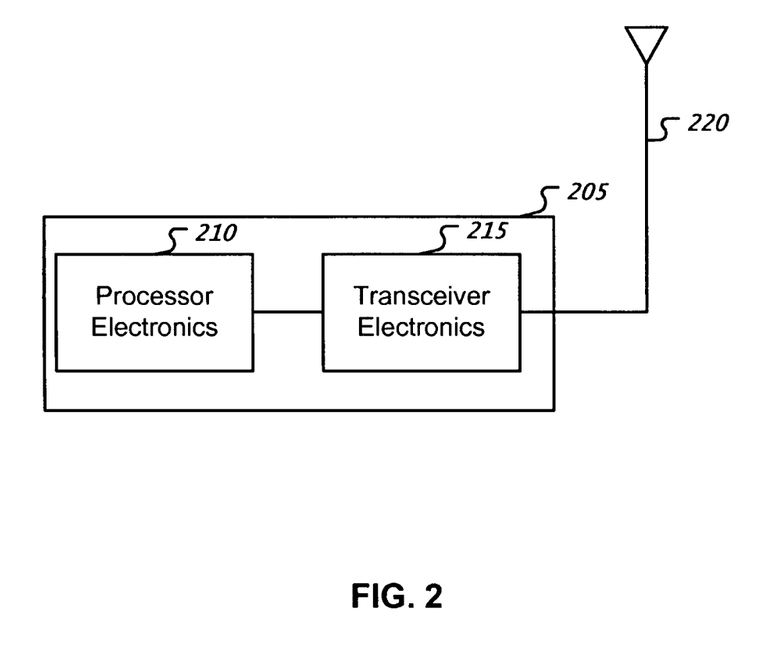
FIG. 2 is a block diagram of a wireless device operable in a wireless communications network.

FIG. 2 is a block diagram representation of a portion of a radio station 205. A radio station 205 such as a base station or a wireless device can include processor electronics 210 such as a microprocessor that implements one or more of the wireless communications techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215.

In some implementations, radio stations 205 can communicate with each other based on a CDMA air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA such as CDMA2000 1x, HRPD, WiMAX, LTE, and Universal Mobile Telecommunications System (UMTS).

The End-to-End (E2E) view of M2M ecosystem may include M2M Applications hosted by the M2M Application Server (AS) and the M2M Devices/Gateways. In this E2E view, the M2M Service Platform provides services such as Data Management, Device Management, Service Enablement capabilities etc. The underlying Transport Network provides transport and communication services for the data flow between the M2M Applications hosted by the M2M Devices/Gateways and the Application Server(s).

With such E2E view of M2M services, the M2M Application Server, M2M Devices/Gateways, the M2M Service Platform and the Transport Network can be considered as different entities in the E2E M2M Services framework. Each of these entities can also be considered as a representation of different business entities. For example, the M2M Application Service Provider is a business entity (e.g., a first Company) that provides M2M Application Services to the end User. M2M Service Provider (SP) is another business entity (e.g., a second Company) that provides M2M Service Platform for use by the M2M Application Service Provider for realizing the services from the M2M Devices/Gateways which may be integrated with Sensing and Actuation (S&A) equipment. The underlying Network Services Provider provides the underlying transport network that could be based on wireline and/or wireless technologies such as those being defined by IEEE, IETF, 3GPP, 3GPP2, BBF etc.

Within the M2M services framework, the M2M Devices/Gateways may host Applications that are specific to different M2M Service Providers (SPs). For example, considering the case of a Smart Home that has S&A equipment for supporting services such as Energy Management, Home Security, Health Monitoring etc. Such services (energy management, home security, health monitoring etc.) are provided by different M2M Service Providers. Yet all these services are hosted in the Smart Home on a single Home Gateway, by the use of S&A equipment for different services. In this service scenario, the Home Gateway is typically owned by the home-owner, whereas the S&A equipment is services-specific (any entity may own the S&A equipment). For example, the S&A equipment for energy management services and health monitoring services is specific to the services being provided, and may require to be managed by the respective M2M Service Providers (Energy Management and Health Monitoring Service Providers in this case).

Similarly, M2M Service Providers may want to manage their respective set of operational environment on the Home Gateway independent of other M2M Service Providers. For example, the Energy Management Service Provider may want to update the energy monitoring software/firmware installed on the Home Gateway. Such updates, however, should not affect the services provided by the Health Monitoring Service Provider. It is also very likely that while providing such diverse set of services, the Home Gateway needs to provide a secure environment for segregating the services being provided different M2M Service Providers.

This example scenario does not exclude the scenario that the Applications and S&As hosted by the M2M Devices/Gateways are common to multiple M2M Service Providers.

The present document provides a method and apparatus for supporting services from multiple M2M Service Providers on an M2M Node (such as on M2M Devices/Gateways).

Figure 3:
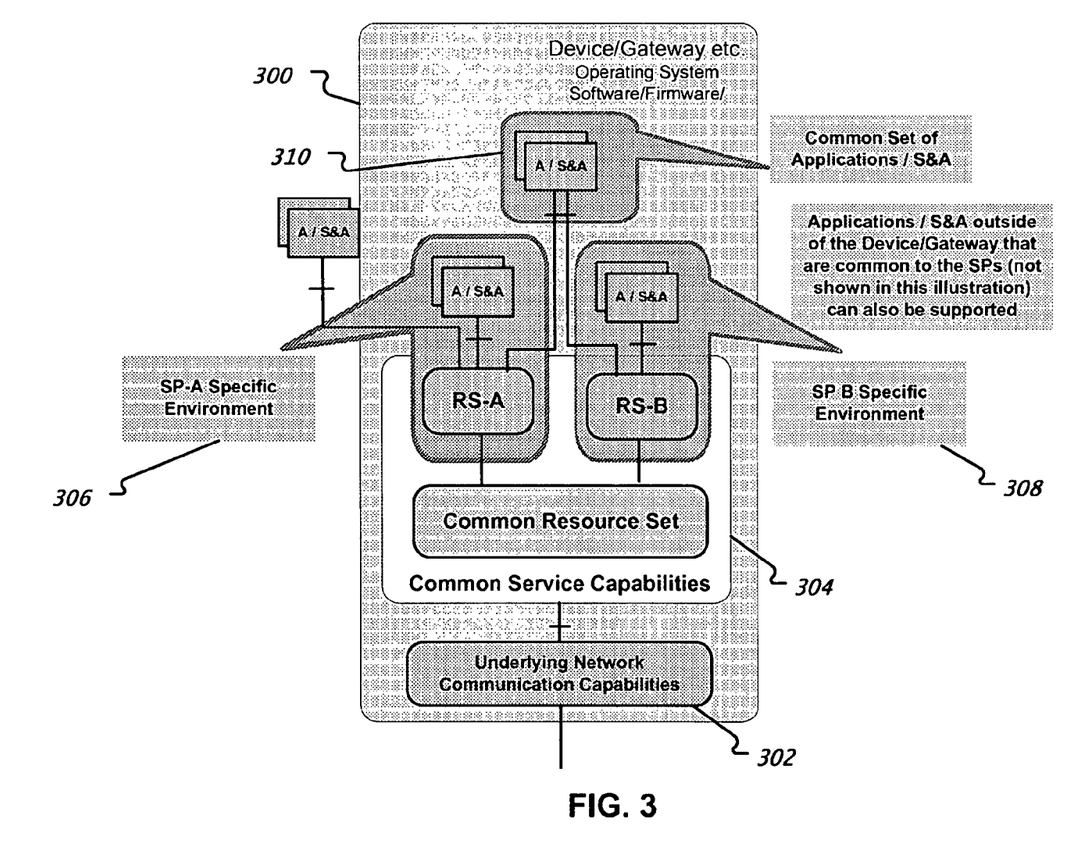
FIG. 3 is a block diagram representation of an example of a machine to machine (M2M) communication node.
Figure 4:
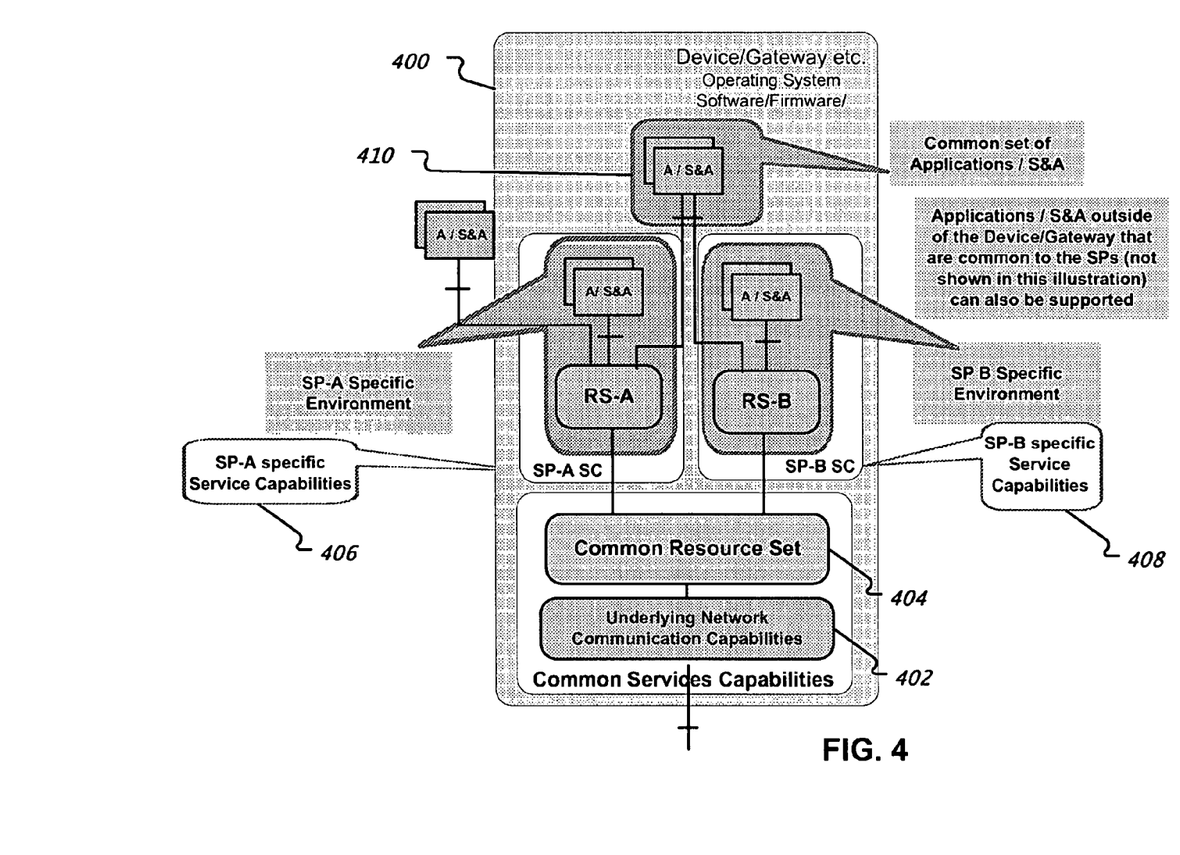
FIG. 4 is a block diagram representation of an example of an M2M node.

FIG. 3 and FIG. 4 illustrate the services environments on an M2M Node for supporting two M2M Service Providers. Similar enhancement can be applicable for supporting services from multiple service providers.

In FIG. 3, a set of underlying network communication capabilities 302 is provided to common service capabilities 304 present in an M2M node 300 (e.g., a device or a gateway). The device 300 includes an application environment 306 that is specific to a service provider A (SP-A) and an application environment 308 specific to SP-B. These application environment include resources that are not commonly shared. Other commonly shared resources are also possible (not shown in the figure). The device 300 may further include a common set 310 of applications and services.

In FIG. 4, the M2M node 400 includes common service capabilities comprising a common resource set 404 and underlying network communication capabilities 402. Each Service provider has service provider specific service capabilities 406, 408 and a common set of applications 410 may also be present in the device 400.

Figure 5:
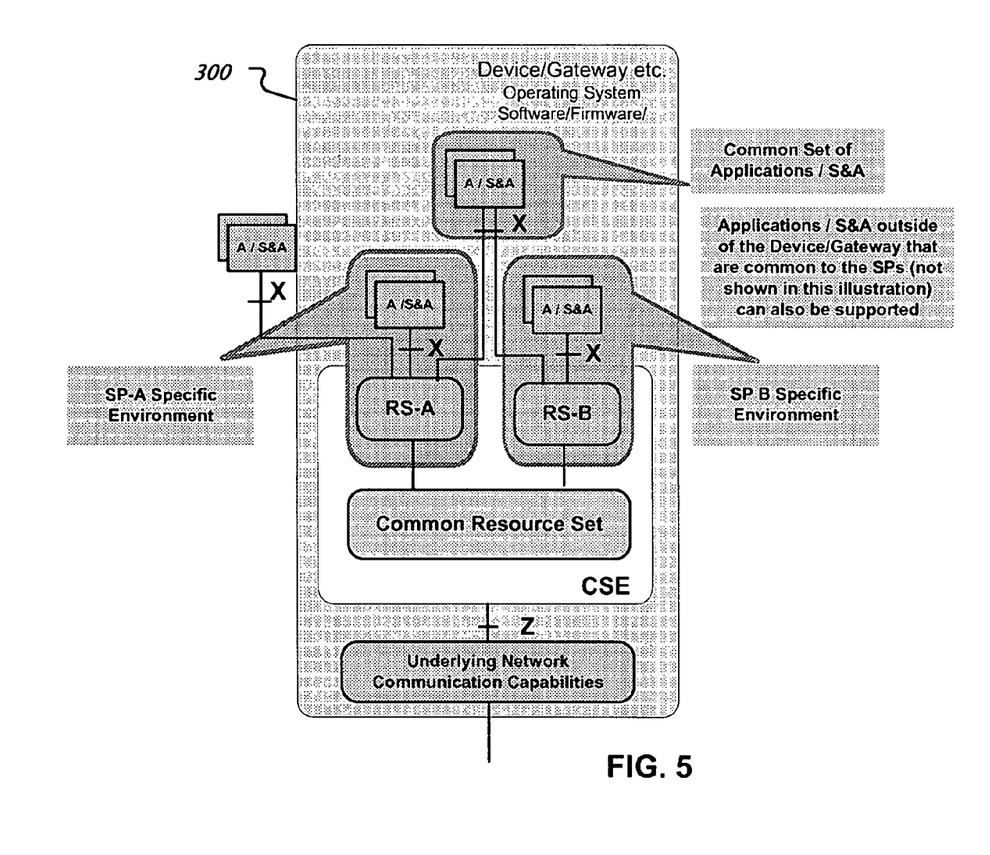
FIG. 5 is a block diagram representation of an example of an M2M node.
Figure 6:
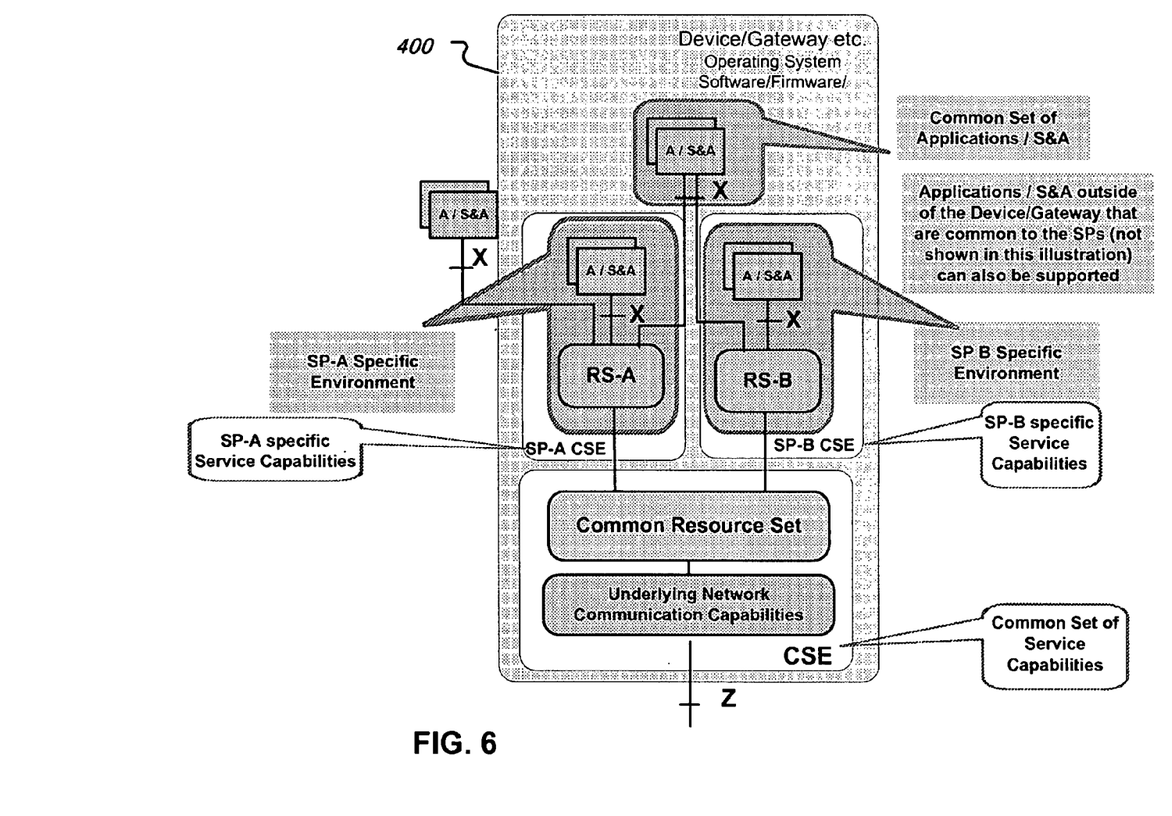
FIG. 6 is a block diagram representation of an example of an M2M node.

FIG. 5 and FIG. 6 are illustrations of the services environment on M2M Nodes 300 and 400, that can be used for one M2M deployments for supporting two M2M Service Providers.

The following set of definitions are taken from the specifications being developed by one M2M.

Application Function (AF): Provides Application logic for the end-to-end M2M solutions. Examples of the Application Functions can be fleet tracking application, remote blood sugar monitoring application, or remote power metering and controlling application.

Application Layer: Comprises of M2M Applications and related business and operational logic.

Common Services Entity (CSE): The Common Services Entity is a collection of Common Service Functions. Common Services Entity at an M2M Node provides a set of services that are used by M2M Applications at that M2M Node or to access services from another M2M Node. The Common Services Entity can utilize the underlying network capabilities and can interact with each other to fulfill the services.

Common Services Function (CSF): The comprises of a set of services/capabilities that are offered by an M2M Node to other entities in the M2M System. Such services/capabilities are exposed to other Common Service Functions (CSFs) through Reference Points X and Y in an M2M System based on one M2M specifications. Common Service Functions use Reference point Z for accessing Underlying Network Services as well. Examples of such CSF are: Data Management & Repository, Device Management and M2M Session Management etc.

Common Services Layer: Consists of M2M service functions that enable M2M applications (via management, discovery and policy enforcement to name a few).

Network Services Layer: Provides transport, connectivity and service functions.

M2M Application: Applications that run the service logic and use M2M Common Services accessible via a set of one M2M specified open interfaces.

M2M Application Service Provider: An entity (e.g. a company) that provides M2M Application Services to the User.

M2M Device: Equipment providing sensing and/or actuation services. An M2M Device hosts one or more M2M Applications and may contain one or more CSEs. An M2M Device may, but does not need to, be co-located with Sensing&Actuation Equipment.

M2M Gateway: Equipment that contains one or more CSEs and may contain M2M Applications. An M2M Gateway communicates with M2M Service Infrastructure and one or more M2M Devices.

M2M Node: A logical entity that consists of CSE(s) and/or M2M Application(s) to represent M2M physical entities such as M2M Devices, M2M Gateways, and M2M Service Infrastructure.

M2M Service Infrastructure: Equipment that provides management of data and coordination capabilities for the M2M Service Provider and communicates with M2M Devices and/or M2M Gateways. M2M Service Infrastructure contains one or more CSEs.

M2M Service Provider: An entity (e.g. a company) that provides M2M Services to a M2M Application Service Provider or to the User.

Underlying Network Services Function (NSF): Underlying Network Services Function provides services to the CSEs from entities external to an M2M Node. Examples of such services include Device Management, Location Services, Device Reachability Status, Device Triggering etc.

Sensing and Actuation (S&A) Equipment: equipment that provides functionality for sensing and/or influencing the physical environment by interacting with one or more M2M Application Services. Sensing and Actuation Equipment can interact with the M2M System, however does not host an M2M Application. S&A Equipment may, but does not need to, be co-located with an M2M Device.

X Reference Point

Reference point between an M2M Application and a CSE. The X reference point allows an M2M Application to use services provided by the CSE, and for the CSE to communicate back with the M2M Application.

Y Reference Point

Reference point between two CSEs. The Y reference point allows a CSE to use services of another CSE to fulfill the needed functionality.

Z Reference Point

Reference point between a CSE and the underlying network. The Z reference point allows a CSE to use the services (other than transport and connectivity services) provided by the underlying network to fulfill needed functionality.

Figure 7:
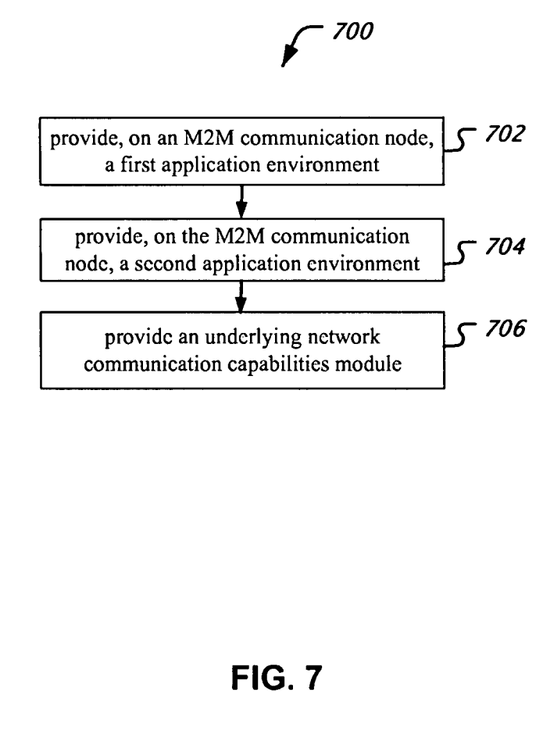
FIG. 7 is a flowchart representation of an example of a method of M2M communication.

FIG. 7 is a flowchart representation of a method 700 of enabling use of a machine to machine (M2M) communication node by multiple service providers. The method is implemented, e.g., in an M2M communication network.

At 702, a first application environment is provided on the M2M communication node, that is specific to a first service provider and includes a first sensing and actuation function specific to the first service provider. The provisioning may be performed by a vendor of the M2M communication node and/or a network operator or an M2M service provider.

At 704, a second application environment that is specific to a second service provider and includes a second sensing and actuation function specific to the second service provider is provided on the M2M communication node.

At 706, an underlying network communication capabilities module that provides network communication to the first application environment and the second application environment is provided on the node.

In the method 700, the first application environment and the second application environment use a common resource set for communicating with the underlying network communication capabilities. The first application environment and the second application environment comprises at least some mutually exclusive resources.

In some embodiments, the underlying network communication capabilities are includes in common services capabilities of the apparatus, thereby allowing control of the underlying network communication capabilities by the first service provider and the second service provider.

In some embodiments, the underlying network communication capabilities are excluded from common services capabilities of the apparatus, thereby disabling control of the underlying network communication capabilities by the first service provider and the second service provider.

In some embodiments, a first interface between the common resource set and the first application environment and a second interface between the common resource set and the second application environment use a same interface protocol.

In some embodiments, the first sensing and actuation function comprises a health monitoring function. In some embodiments, the underlying network communication capabilities comprise wireless communication capabilities.

Figure 8:
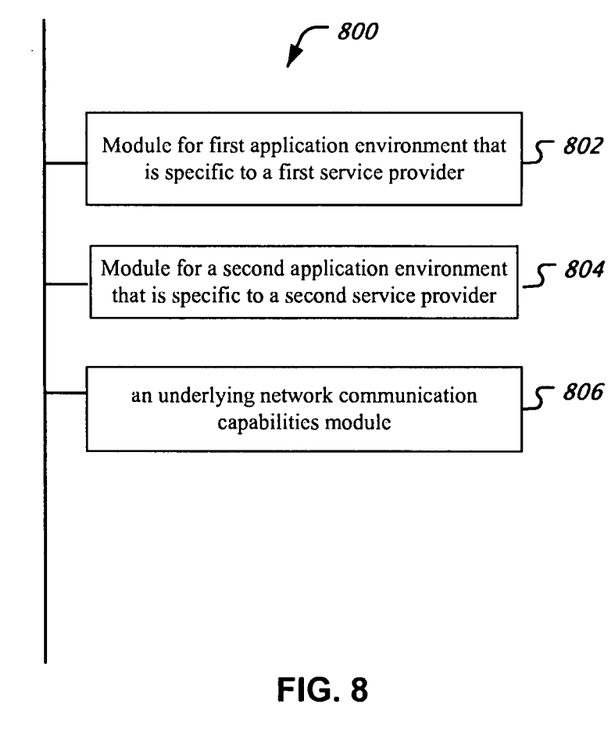
FIG. 8 is a block diagram representation of an example of an M2M communication apparatus.

FIG. 8 is a block diagram depiction of an example of an M2M communication apparatus 800. The module 802 comprises a first application environment that is specific to a first service provider and includes a first sensing and actuation function specific to the first service provider; The module 804 comprises a second application environment that is specific to a second service provider and includes a second sensing and actuation function specific to the second service provider. The module 806 comprises an underlying network communication capabilities module that provides network communication to the first application environment and the second application environment. The first application environment and the second application environment use a common resource set for communicating with the underlying network communication capabilities. The first application environment and the second application environment comprises at least some mutually exclusive resources.

In some embodiments, a machine to machine (M2M) communication system includes a first M2M application server that hosts a first M2M application service, a second M2M application server that hosts a second M2M application service and an M2M node communicatively coupled to the first M2M application server and the second M2M application server via an access network. The M2M node includes a first application environment that is specific to the first M2M application service, a second application environment that is specific to the second M2M application service, an underlying network communication capabilities module that provides network communication to the first application environment and the second application environment. The first application environment and the second application environment use a common resource set for communicating with the underlying network communication capabilities. The first application environment and the second application environment comprises at least some mutually exclusive resources. In some embodiments, the first M2M application service comprises a health monitoring service and wherein the second M2M application service comprises an energy management service. In some embodiments, the communication coupling between the M2M node and the first M2M application server and the second M2M application server comprises a wireless network.

It will be appreciated that an M2M communication framework is disclosed in which multiple application service environment can be implemented to concurrently work on an M2M node. Each application service environment may control some resources that are exclusive to that environment and may share some resources with other application service environments.

It will further be appreciated that the disclosed technology may be used to enable multiple service providers to provide M2M application services on a single hardware platform.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An apparatus for machine to machine (M2M) communication, comprising:
   one or more memories that store code; and
   a processor that reads the code from the one or more memories and implements a method of enabling use of a M2M communication node by multiple service providers that comprises:
      hosting a first application environment that is specific to a first service provider and includes a first sensing and actuation function specific to the first service provider;
      hosting a second application environment that is specific to a second service provider and includes a second sensing and actuation function specific to the second service provider; and
   providing network communication to the first application environment and the second application environment;
   wherein the first application environment and the second application environment communicate with underlying network communication capabilities for the network communication;
   wherein the first application environment and the second application environment use a common resource set for communicating with the underlying network communication capabilities;
   wherein the first application environment and the second application environment comprises at least some resources that are not commonly shared so that changes to the first application environment do not affect the second application environment and changes to the second application environment do not affect the first application environment.

2. The apparatus of claim 1, wherein the underlying network communication capabilities are included in common services capabilities of the apparatus, thereby allowing control of the underlying network communication capabilities by the first service provider and the second service provider.

3. The apparatus of claim 1, wherein the underlying network communication capabilities are excluded from common services capabilities of the apparatus, thereby disabling control of the underlying network communication capabilities by the first service provider and the second service provider.

4. The apparatus of claim 1, wherein a first interface between the common resource set and the first application environment and a second interface between the common resource set and the second application environment use a same interface protocol.

5. The apparatus of claim 1, wherein the first sensing and actuation function comprises a health monitoring function.

6. The apparatus of claim 1, wherein the underlying network communication capabilities comprise wireless communication capabilities.

7. A method of enabling use of a machine to machine (M2M) communication node by multiple service providers, comprising:
   hosting, on the M2M communication node, a first application environment that is specific to a first service provider and includes a first sensing and actuation function specific to the first service provider;
   hosting, on the M2M communication node, a second application environment that is specific to a second service provider and includes a second sensing and actuation function specific to the second service provider; and
   providing network communication to the first application environment and the second application environment;
   wherein the first application environment and the second application environment communicate with underlying network communication capabilities for the network communication;
   wherein the first application environment and the second application environment use a common resource set for communicating with the underlying network communication capabilities;
   wherein the first application environment and the second application environment comprises at least some resources that are not commonly shared so that changes to the first application environment do not affect the second application environment and changes to the second application environment do not affect the first application environment.

8. The method of claim 7, wherein the underlying network communication capabilities are included in common services capabilities of the M2M communication node, thereby allowing control of the underlying network communication capabilities by the first service provider and the second service provider.

9. The method of claim 7, wherein the underlying network communication capabilities are excluded from common services capabilities of the M2M communication node, thereby disabling control of the underlying network communication capabilities by the first service provider and the second service provider.

10. The method of claim 7, wherein a first interface between the common resource set and the first application environment and a second interface between the common resource set and the second application environment use a same interface protocol.

11. The method of claim 7, wherein the first sensing and actuation function comprises a health monitoring function.

12. The method of claim 7, wherein the underlying network communication capabilities comprise wireless communication capabilities.

13. A machine to machine (M2M) communication system, comprising:
   a first M2M application server that hosts a first M2M application service;
   a second M2M application server that hosts a second M2M application service;
   an M2M node communicatively coupled to the first M2M application server and the second M2M application server via an access network;
   wherein the M2M node includes:

a first application environment that is specific to the first M2M application service;

a second application environment that is specific to the second application service; and an underlying network communication capabilities module that provides network communication to the first application environment and the second application environment;

wherein the first application environment and the second application environment use a common resource set for communicating with the underlying network communication capabilities; and wherein the first application environment and the second application environment comprises at least some resources that are not commonly shared so that changes to the first application environment do not affect the second application environment and changes to the second application environment do not affect the first application environment.

14. The system of claim 13, wherein the first M2M application service comprises a health monitoring service and wherein the second M2M application service comprises an energy management service.

15. The system of claim 13, wherein the communication coupling between the M2M node and the first M2M application server and the second M2M application server comprises a wireless network.

* * * * *